Figure 1:
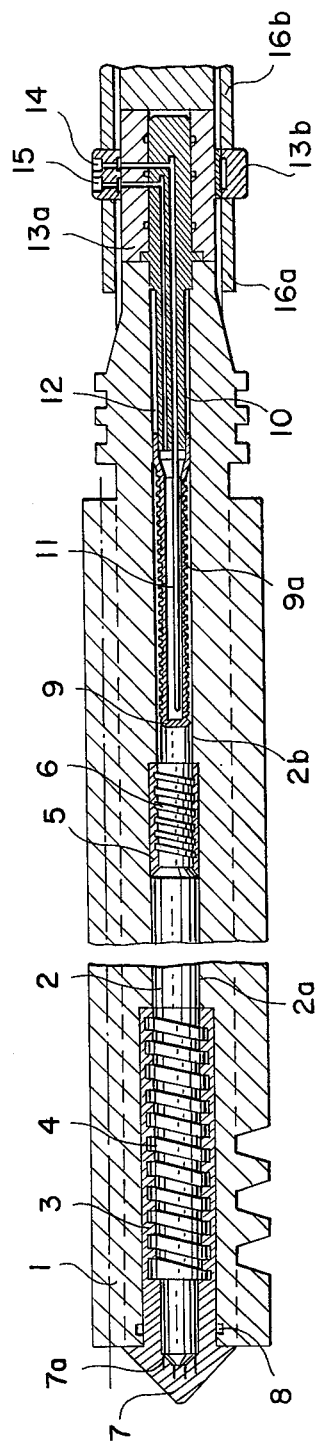

United States Patent [19]

Heitzer et al.

[11] 3,946,803

[45] Mar. 30, 1976

[54] APPARATUS FOR CONTROLLING TEMPERATURE OF AN EXTRUDER SCREW

[75] Inventors: Robert Heitzer, Bogen; Peter Klenk, Munich, both of Germany

[73] Assignee: Kunststoffwerk Gebruder Anger GmbH & Co., Munich, Germany

[22] Filed: Mar. 8, 1974

[21] Appl. No.: 449,499

[52] U.S. Cl............... 165/87; 259/191; 425/378 R
[51] Int. Cl.² ........................................... F28F 5/06
[58] Field of Search ........ 165/87; 425/378, 9, 259, 425/192–194, 10, DIG. 18; 259/191, 192

[56] References Cited
UNITED STATES PATENTS

| | | | |
|---|---|---|---|
| 1,902,295 | 3/1933 | Shook | 165/87 |
| 2,653,348 | 9/1953 | Elgin et al. | 165/87 X |
| 2,702,410 | 2/1955 | Brown | 425/378 |
| 3,007,198 | 11/1961 | Colwell et al. | 165/87 X |
| 3,310,836 | 3/1967 | Nichols | 165/87 |
| 3,738,420 | 6/1973 | Poux et al. | 165/87 X |

*Primary Examiner*—Charles J. Myhre
*Assistant Examiner*—Theophil W. Streule, Jr.
*Attorney, Agent, or Firm*—Edmund M. Jaskiewicz

[57] ABSTRACT

The temperature of an extruder screw having an axial bore therein is controlled by providing a closed temperature control system within the screw which is in heat transfer relationship with a second temperature control system through which is circulated a cooling medium from an outside source. The quantity of outside cooling medium may be monitored to control the closed temperature control system. The apparatus for carrying out this process comprises a cooling medium retained within the screw and a heat exchanger extending into the cooling medium. A second cooling medium from an outside source is circulated through the heat exchanger so that heat is transmitted from the closed circuit cooling medium to the open circuit cooling medium.

7 Claims, 2 Drawing Figures

APPARATUS FOR CONTROLLING TEMPERATURE OF AN EXTRUDER SCREW

The present invention relates to an extruder screw of the type having an axial bore therein, more particularly, to a process and apparatus for controlling the temperature of such an extruder screw.

It has been known to control the temperature of extruder screws. Essentially, two different types of systems have been used. One such system may be described as a closed system wherein the screw is provided with a hollow cavity in the portion of the screw threads and the cavity is filled partially at room temperature and under a subatmospheric pressure with a cooling liquid subjected to its own vapor pressure. The cavity is hermetically closed and the cooling liquid is conveyed to the tip of the screw by the rotation of the screw during its operation. (German DOS No. 1 729 344). The second system may be described as an open system wherein a cooling liquid is circulated through a hollow portion of the screw. The liquid is generally introduced into the screw through a coaxial pipe whose open end is adjacent the tip of the screw so that the entering liquid initially cools off the end of the screw and flows from there backwardly against the flow of the mass. (D. Schenkel, "Schneckenpressen fur Kunststoffe," Screw presses for synthetic resins, Munchin, page 255, and German Publication Document DOS No. 1 729 347).

The closed system has the disadvantage that the condensation process cannot be influenced in any way from outside of the extruder screw since the process occurs within a hermetically sealed enclosure. In order to increase the efficiency of such an enclosed cooling system German DAS No. 1 267 833 proposed to insert a screw conveyor into the bore enclosing the cooling medium. However, this proposal has not been satisfactory for exerting influence on a closed cooling system of an extruder screw.

The open cooling system has the disadvantage that the oil used as the cooling medium does not have the same cooling effect as steam. In addition, the use of oil presents serious sealing problems particularly on the rotary coupling which is required between the extruder and the outside source of coolant. A further disadvantage is that the oil may find its way into the plasticizing cylinder which may adversely affect the process of working the plastic. Other disadvantages are that the automatic device used for oil temperature control may incur a leakage after a period of operation so that the extruding apparatus and the environment become soiled with the cooler oil.

It is therefore the principal object of the present invention to provide a novel and improved process and apparatus for temperature control of an extruder cylinder.

It is a further object of the present invention to provide a process and apparatus for temperature control of an extruder screw which can be controlled from outside the screw.

It is another object of the present invention to provide an apparatus for the temperature control of an extruder screw which employs a closed temperature control system but which avoids the disadvantages of known processes and apparatus.

The objects as set forth above are achieved by the present invention wherein a closed temperature control system is combined with an open temperature control system in such a manner that the closed system arranged within an axial bore of the extruder screw transmits heat energy through a heat exchanger extending into the bore and the heat exchanger is traversed by a flowing cooling medium applied from an outside source in metered quantities and then removed so that the heat exchanger controls the closed system. According to one aspect the process may comprise establishing a closed temperature control system including a cooling medium within the bore of an extruder screw. A cooling medium from an outside source is circulated through the bore in heat exchange relationship with the closed system cooling medium but independent therefrom so that heat energy is transmitted from the closed system to the circulated cooling medium. The quantity of cooling medium circulated from the outside source is metered to control the closed temperature control system.

One aspect of the apparatus according to the present invention may comprise a first cooling medium within the bore of the extruder screw to define a closed temperature control system and a heat exchanger extending into the bore in heat exchange relationship with the first cooling medium. Means are provided for circulating from an outside source a second cooling medium through the heat exchanger whereby heat energy is transmitted from the first cooling medium to the second cooling medium. Means are also provided for metering the quantity of second cooling medium circulated so that the closed system is controlled by the heat exchanger.

Figure 2:
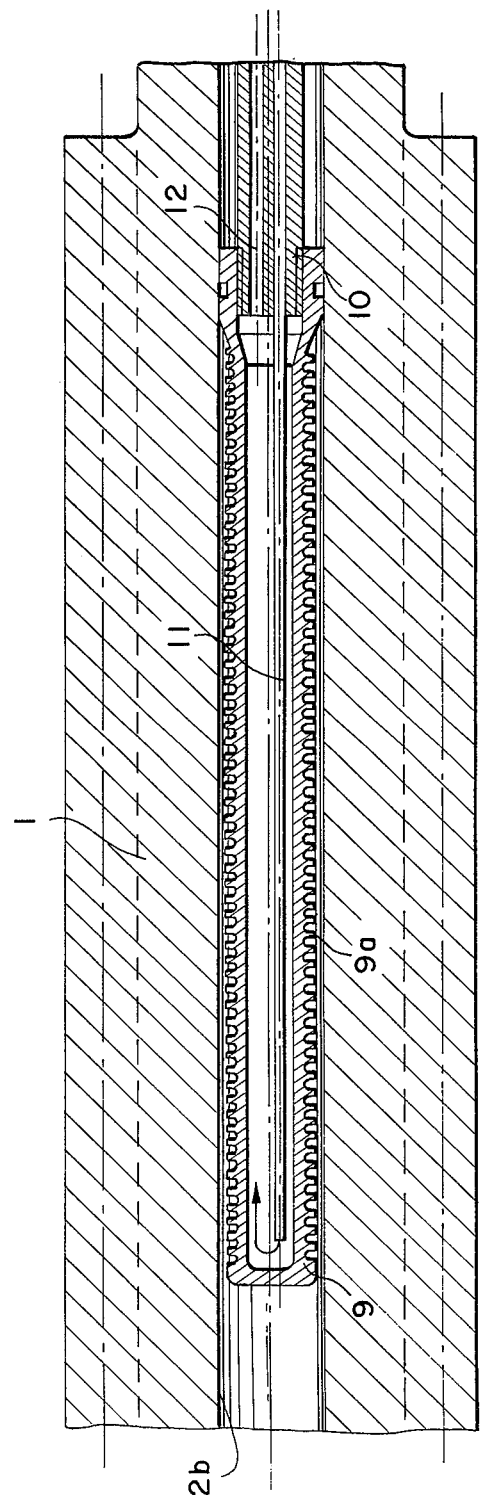

Other objects and advantages of the present invention will be apparent upon reference to the accompanying description when taken in conjunction with the following drawings, which are exemplary, wherein;

FIG. 1 is a longitudinal sectional view through an extruder screw incorporating the present invention; and FIG. 2 is a portion of FIG. 1 in the vicinity of the heat exchanger but in enlarged scale.

Proceeding next to the drawings wherein like reference symbols indicate the same parts throughout the various views a specific embodiment of the present invention will be described in detail.

As may be seen in FIG. 1, an extruder screw 1 is provided with an axial bore 2 that defines the interior space of the screw. The bore 2 comprises two smooth walled sections of different diameters 2a and 2b. The larger diameter portion 2a has positioned forwardly thereof a large sleeve 3 of a non-ferrous metal which has good heat conducting properties and which comprises an internal helical path 4 or thread to convey the cooling medium from the area of the heat exchanger toward the tip end of the screw.

Rearwardly of the smooth wall portion 2a is a smaller sleeve 5 having a helical path 6 for conveying cooling medium and made of the same material as sleeve 3. The inner diameter of the sleeve 3 is substantially equal to the diameter of bore portion 2a.

The bore 2 extends throughout the length of the screw which is provided with threads by means of which the plastic is conveyed to the extrusion die. The bore 2 is closed hermetically at the front end by a tip 7 which is provided with a plurality of incisions 7a on its inner face for the purpose of increasing the cooling surface and thus to provide for a more effective transfer of heat which may be concentrated at the front of the screw. A packing 8 is provided around the base portion of the tip to seal the bore 2.

At the rear end of the bore 2 there is mounted a cylindrical heat exchanger 9 provided with a helical fin 9a on its outer surface. The heat exchanger 9 is connected to a rotary coupling 13a, 13b by means of an insertion coupling 10 which seals the bore 2 hermetically at the rear portion thereof. An inlet pipe 11 passes through the coupling 10 and opens at a point adjacent the front end of the heat exchanger 9. To provide intensive cooling at that point. Also within the coupling 10 is the return tube 12. A suitable cooling medium which may comprise oil, water, or a suitable coolant as known in the art is supplied through supply tube 14 from an outside source to inlet tube 11 and then returned through return tube 12 and return pipe 15 back to the source.

The splined sleeves of the drive for the extruder screw, which is not illustrated in the drawing, are designated at 16a and 16b.

The bore 2 retains a suitable tempering medium which remains at all times within the bore and which is separate and distinct from the cooling medium circulated through the heat exchanger 9. Except for a heat transfer relationship, there is no direct connection between the two cooling media.

There is only the possibility of indirect heat exchange through the outer jacket of the heat exchanger 9. The tempering medium enclosed within bore 2 is controlled by regulating or metering the quantity as well as the temperature of the coolant circulating through heat exchanger 9. In applicant's process water may be used as both the tempering medium and the cooling medium which would eliminate all of the above discussed disadvantages of oil as a tempering and/or cooling medium.

The invention can be carried out without the use of sleeves 3 and 5. However, these sleeves may be employed for concentrating the cooling effect at certain designated portions of the screw. The different diameter portions 2a and 2b of the screw can be located corresponding to the different torques exerted upon the extruder screw during the extruding operation.

The present invention can also be applied to extruders using a single screw or multi-screw structures as well as to injection molding machines.

The apparatus according to the present invention has the advantage of achieving a temperature control which can be regulated much mor effectively than previously employed systems used in controlling the temperature in extruder screws. The condensation process in the bore of the extruder screw can thus be controlled by means of the heat exchanger positioned within the bore of the screw. The accumulation of heat in the extruder screw itself can thus be effectively counter-acted by removing these localized heat areas by the effective circulation of the cooling media and the use of the sleeves within the bore.

It will be understood that this invention is susceptible to modification in order to adapt it to different usages and conditions, and accordingly, it is desired to comprehend such modifications within this invention as may fall within the scope of the appended claims.

What is claimed is:

1. In an extruder screw having an axial bore therein and said axial bore having tip and rear ends, the combination of a first cooling medium substantially throughout the length of said bore to define a closed temperature control system to cool the length of the extruder screw, a heat exchanger extending into said axial bore from said rear end thereof and extending a portion of the length of said bore such that the first cooling medium flows in heat exchange relationship with said heat exchanger, means for circulating from an external source a second cooling medium through said heat exchanger independently of said first cooling medium whereby heat energy is transmitted from said first cooling medium to said second cooling medium, means within said bore for conveying the first cooling medium from the area of the heat exchanger toward the tip end of the bore, means for closing hermetically said axial bore at both ends thereof and means for metering the quantity of second cooling medium circulated so that the closed system is controlled by said heat exchanger.

2. In an extruder screw as claimed in claim 1 and a rotary coupling connecting said heat exchanger to said outside source of circulating second cooling medium.

3. In an extruder screw as claimed in claim 1 wherein said conveying means comprises a helical sleeve of a non-ferrous material having good heat conducting properties inserted into said sleeve.

4. In an extruder screw as claimed in claim 1 wherein said heat exchanger has a helical fin along the outer surface thereof.

5. In an extruder screw as claimed in claim 1 wherein said bore has different diameter portions corresponding to the varying torques exerted on the screw.

6. In an extruder screw as claimed in claim 1 and an inlet tube within said heat exchanger opening near the outer end thereof for introducing the second cooling medium into the heat exchanger.

7. In an extruder screw as claimed in claim 1 and a tip on the outer end of the screw and closing said bore therein, said tip having a plurality of cuts in the inner face thereof.

* * * * *